United States Patent
Amata et al.

(10) Patent No.: US 10,112,268 B2
(45) Date of Patent: Oct. 30, 2018

(54) SYSTEMS AND METHODS FOR CORROSION-RESISTANT WELDING ELECTRODES

(71) Applicant: HOBART BROTHERS COMPANY, Troy, OH (US)

(72) Inventors: Mario Anthony Amata, Dublin, OH (US); Steven Edward Barhorst, Sidney, OH (US); Tre' Dorell Heflin-King, Dayton, OH (US)

(73) Assignee: HOBART BROTHERS COMPANY, Troy, OH (US)

( * ) Notice: Subject to any disclaimer, the term of this patent is extended or adjusted under 35 U.S.C. 154(b) by 910 days.

(21) Appl. No.: 14/509,220

(22) Filed: Oct. 8, 2014

(65) Prior Publication Data

US 2015/0099140 A1 Apr. 9, 2015

Related U.S. Application Data

(60) Provisional application No. 62/054,818, filed on Sep. 24, 2014, provisional application No. 61/888,965, filed on Oct. 9, 2013.

(51) Int. Cl.
*B23K 35/30* (2006.01)
*B23K 35/40* (2006.01)
(Continued)

(52) U.S. Cl.
CPC .......... *B23K 35/3093* (2013.01); *B23K 9/173* (2013.01); *B23K 35/02* (2013.01);
(Continued)

(58) Field of Classification Search
CPC .......... B23K 9/24; B23K 35/36; B23K 35/40; B23K 35/02; B23K 35/0255;
(Continued)

(56) References Cited

U.S. PATENT DOCUMENTS 2,053,956 A 9/1936 Humberstone
2,870,047 A 1/1959 Kee
(Continued)

FOREIGN PATENT DOCUMENTS

AT 274513 10/2006
CN 1974106 6/2007
(Continued)

OTHER PUBLICATIONS

Stainless Steel Overview (Stainless Plate Products) [retrieved on Sep. 26, 2017]. Retrieved from : <URL:Http://http://www.sppusa.com/stainlesssteel_overview.php> (Year: 2017).*
(Continued)

*Primary Examiner* — David Sample
*Assistant Examiner* — Elizabeth Collister
(74) *Attorney, Agent, or Firm* — McAndrews, Held & Malloy, Ltd.

(57) ABSTRACT

The invention relates generally to welding and, more specifically, to welding wires for arc welding, such as Gas Metal Arc Welding (GMAW) or Flux Core Arc Welding (FCAW). A disclosed tubular welding wire has a sheath and a core, and the tubular welding wire includes an organic stabilizer component, a rare earth component, and a corrosion resistant component comprising one or more of: nickel, chromium, and copper.

13 Claims, 2 Drawing Sheets

(51) Int. Cl.
  *B23K 35/36* (2006.01)
  *B23K 35/02* (2006.01)
  *B23K 35/24* (2006.01)
  *B23K 9/173* (2006.01)

(52) U.S. Cl.
  CPC ...... *B23K 35/0255* (2013.01); *B23K 35/0261* (2013.01); *B23K 35/0266* (2013.01); *B23K 35/24* (2013.01); *B23K 35/30* (2013.01); *B23K 35/308* (2013.01); *B23K 35/3053* (2013.01); *B23K 35/3066* (2013.01); *B23K 35/3086* (2013.01); *B23K 35/36* (2013.01); *B23K 35/3601* (2013.01); *B23K 35/3602* (2013.01); *B23K 35/3608* (2013.01); *B23K 35/3612* (2013.01); *B23K 35/3618* (2013.01); *B23K 35/40* (2013.01); *B23K 35/404* (2013.01); *B23K 35/406* (2013.01); *Y10T 29/49117* (2015.01); *Y10T 428/12799* (2015.01); *Y10T 428/12965* (2015.01)

(58) Field of Classification Search
  CPC ............ B23K 35/0261; B23K 35/0266; B23K 35/24; B23K 35/30; B23K 35/3053; B23K 35/3066; B23K 35/308; B23K 35/3086; B23K 35/3093; B23K 35/3601; B23K 35/3602; B23K 35/3608; B23K 35/3612; B23K 35/3618; B23K 35/404; B23K 35/406; B23K 9/173; Y10T 29/49117; Y10T 428/12799; Y10T 428/12965
  USPC ....................................................... 428/685
  See application file for complete search history.

(56) References Cited

U.S. PATENT DOCUMENTS

| | | | |
|---|---|---|---|
| 2,895,854 A | 7/1959 | Rocque | |
| 2,900,490 A | 8/1959 | Petryck | |
| 3,036,205 A | 5/1962 | Masao | |
| 3,107,176 A | 10/1963 | Witherell | |
| 3,124,479 A | 3/1964 | Witherell | |
| 3,167,450 A | 1/1965 | Masao | |
| 3,318,729 A | 5/1967 | Siegle | |
| 3,342,972 A | 9/1967 | Penberg | |
| 3,345,495 A | 10/1967 | Quaas | |
| 3,452,419 A | 7/1969 | Hillert | |
| 3,453,142 A | 7/1969 | Dorschu | |
| 3,491,225 A | 1/1970 | Oku | |
| 3,501,354 A | 3/1970 | DeLong | |
| 3,519,783 A | 7/1970 | Forsberg | |
| 3,533,152 A | 10/1970 | Gloor | |
| 3,542,998 A | 11/1970 | Huff | |
| 3,554,792 A * | 1/1971 | Johnson | B23K 35/3066 148/24 |
| 3,555,240 A | 1/1971 | Gloor | |
| 3,558,851 A | 1/1971 | Oku | |
| 3,559,864 A | 2/1971 | Hillert | |
| 3,560,702 A | 2/1971 | Arikawa | |
| 3,620,830 A | 11/1971 | Kramer | |
| 3,625,757 A | 12/1971 | Mott | |
| 3,643,061 A | 2/1972 | Duttera | |
| 3,768,996 A | 10/1973 | Metz | |
| 3,769,099 A | 10/1973 | DeLong | |
| 3,778,588 A | 12/1973 | Bishel | |
| 3,783,234 A | 1/1974 | Russell | |
| 3,805,016 A | 4/1974 | Soejima | |
| 3,818,178 A | 6/1974 | Nakabayashi | |
| 3,851,143 A | 11/1974 | Bishel | |
| 3,909,253 A | 9/1975 | Asnis | |
| 3,935,414 A | 1/1976 | Ballass | |
| 3,947,655 A | 3/1976 | Gonzalez | |
| 3,999,036 A | 12/1976 | Muratov | |
| 4,122,238 A | 10/1978 | Frantzerb, Sr. | |
| 4,343,984 A | 8/1982 | Smith | |
| 4,551,610 A | 11/1985 | Amata | |
| 4,593,174 A | 6/1986 | Saito | |
| 4,662,952 A | 5/1987 | Barringer | |
| 4,689,461 A | 8/1987 | Gamberg | |
| 4,721,837 A | 1/1988 | Gamberg | |
| 4,843,212 A | 6/1989 | Shneerov | |
| 4,920,254 A | 4/1990 | DeCamp | |
| 4,940,882 A | 7/1990 | Bates | |
| 5,055,655 A | 10/1991 | Chai | |
| 5,218,757 A | 6/1993 | Kaneko | |
| 5,300,754 A | 4/1994 | Gonzalez | |
| 5,473,139 A | 12/1995 | Matsui | |
| 5,580,475 A | 12/1996 | Sakai | |
| 5,744,782 A | 4/1998 | Sampath | |
| 5,857,141 A | 1/1999 | Keegan | |
| 5,898,022 A | 4/1999 | Maples | |
| 6,339,209 B1 | 1/2002 | Kotecki | |
| 6,410,885 B1 | 6/2002 | Correia | |
| 6,476,356 B2 | 11/2002 | Kim | |
| 6,608,284 B1 | 8/2003 | Nikodym | |
| 6,723,954 B2 | 4/2004 | Nikodym | |
| 6,940,042 B2 | 9/2005 | Hara | |
| 7,087,859 B2 | 8/2006 | Burt | |
| 7,087,860 B2 | 8/2006 | Nikodym | |
| 7,807,948 B2 | 10/2010 | Katiyar | |
| 7,812,284 B2 | 10/2010 | Narayanan | |
| 8,258,432 B2 | 9/2012 | Narayanan | |
| 8,337,643 B2 | 12/2012 | Sun | |
| 8,758,901 B2 | 6/2014 | Nakamura | |
| 8,907,248 B2 | 12/2014 | Amata | |
| 9,199,341 B2 | 12/2015 | Barhorst | |
| 2002/0008096 A1 | 1/2002 | Kim | |
| 2002/0153364 A1 | 10/2002 | North | |
| 2003/0136765 A1 | 7/2003 | Miklos | |
| 2003/0136774 A1 | 7/2003 | Nikodym | |
| 2003/0178402 A1 | 9/2003 | Nikodym | |
| 2003/0222059 A1 | 12/2003 | De Kock | |
| 2004/0084421 A1 | 5/2004 | Bolton | |
| 2004/0187961 A1 | 9/2004 | Crockett | |
| 2005/0121110 A1 | 6/2005 | Dallam | |
| 2005/0224481 A1 | 10/2005 | Nadzam | |
| 2006/0096966 A1 | 5/2006 | Munz | |
| 2006/0186103 A1 | 8/2006 | Rajan | |
| 2006/0207984 A1 | 9/2006 | Karogal | |
| 2006/0255027 A1 | 11/2006 | Katiyar | |
| 2006/0261054 A1 | 11/2006 | Katiyar | |
| 2006/0278627 A1 | 12/2006 | Burt | |
| 2006/0283848 A1 | 12/2006 | Karogal | |
| 2008/0000892 A1 | 1/2008 | Hirano | |
| 2008/0206594 A1 | 8/2008 | Fukuda | |
| 2008/0272100 A1 | 11/2008 | Amata | |
| 2009/0017328 A1 | 1/2009 | Katoh | |
| 2009/0039065 A1 | 2/2009 | Nakamura | |
| 2009/0095720 A1 | 4/2009 | Kamei | |
| 2009/0321404 A1 | 12/2009 | Keegan | |
| 2010/0147818 A1 | 6/2010 | Fondriest | |
| 2011/0017712 A1 | 1/2011 | Wada | |
| 2011/0174784 A1 | 7/2011 | Kamei | |
| 2011/0240604 A1 | 10/2011 | Panday | |
| 2011/0253691 A1 | 10/2011 | Kodama | |
| 2013/0012696 A1 | 1/2013 | Adden | |
| 2013/0153557 A1 | 6/2013 | Pagano | |
| 2013/0193124 A1 | 8/2013 | Peters | |
| 2013/0233839 A1 | 9/2013 | Barhorst et al. | |
| 2013/0270248 A1 | 10/2013 | Barhorst et al. | |
| 2013/0292362 A1 | 11/2013 | Fairchild | |
| 2013/0313240 A1 | 11/2013 | Amata et al. | |
| 2014/0061166 A1 | 3/2014 | Barhorst | |
| 2014/0061175 A1 * | 3/2014 | Barhorst | B23K 35/0266 219/137 WM |
| 2014/0061179 A1 | 3/2014 | Barhorst | |
| 2015/0096965 A1 | 4/2015 | Kawamoto | |

FOREIGN PATENT DOCUMENTS

| | | |
|---|---|---|
| CN | 101288918 | 10/2008 |
| CN | 101323057 | 12/2008 |
| CN | 101618486 | 1/2010 |

(56) References Cited

FOREIGN PATENT DOCUMENTS

| | | | |
|---|---|---|---|
| CN | 10265792 | 8/2010 | |
| CN | 102009286 | 4/2011 | |
| CN | 102091881 | 6/2011 | |
| CN | 102371444 | 3/2012 | |
| CN | 102990244 | 3/2013 | |
| CN | 103381525 | 11/2013 | |
| EP | 0652071 | 5/1995 | |
| EP | 0688630 | 12/1995 | |
| EP | 0688630 B1 * | 8/2001 | ......... B23K 35/3608 |
| EP | 1155769 | 11/2001 | |
| EP | 1537940 | 6/2005 | |
| EP | 1775060 | 4/2007 | |
| EP | 2110195 | 10/2009 | |
| EP | 2341 159 | 7/2011 | |
| GB | 363815 | 12/1931 | |
| GB | 863072 | 3/1961 | |
| GB | 937063 | 9/1963 | |
| GB | 1007039 A * | 10/1965 | ......... B23K 35/3606 |
| GB | 1383304 | 2/1974 | |
| GB | 1497347 | 1/1978 | |
| JP | S57159294 | 10/1982 | |
| JP | S60257992 | 12/1985 | |
| SU | 407695 | 12/1973 | |
| WO | 8907036 | 8/1982 | |
| WO | 2005115680 | 12/2005 | |
| WO | 2008004699 | 1/2008 | |
| WO | 2014113155 | 7/2014 | |

OTHER PUBLICATIONS

English Translation of CN 102091881, Sugahara et al. (translated Mar. 27, 2018). (Year: 2011).*

Tae-Jin, Kim, et al.; "Characteristics of Pulse MIG Arc Welding with a Wire Melting Rate Change by Current Polarity Effect," Journal of Electrical Engineering & Technology, vol. 2, No. 3, Sep. 1, 2007, pp. 366-372.

International Search Report from PCT application No. PCT/US2015/055184, dated Jan. 27, 2016, 14 pgs.

"Sodium Carboxymethyl Cellulose," FNP 13/2, 1984.

"Sodium Carboxymethylcellulose: Physical and Chemical Properties," Hercules Incorporated, Aqualon Division, 1999.

Baker, Cathleen; "Methylcellulose & Sodium Carboxymethylcellulose: Uses in Paper Conservation," The American Institute for Conservation, Fall 1982.

Anonymous; "Sodium Carbonate," Wikipedia, The Free Encyclodedia, http://en.wikipedia.org/wiki/Sodium_carbonate [retrieved on Aug. 5, 2015].

Arc Welding Automotive Components, Chrysler Group LLC Process Standard Category Code: D-1, Sep. 8, 2009, pp. 1-16.

International Search Report for PCT application No. PCT/US2014/059701, dated Jul. 10, 2015, 17 pgs.

"Specification for Stainless Steel Flux Cored and Metal Cored Welding Electrodes and Rods," American Welding Society 4th Edition, AWS 5.22/A5.22M:2010, Aug. 27, 2009, ISBN 978-0-87171-764-1, pp. 3, 18, 19, 28, and 29.

Du et al., "Welding of Dissimilar Metals", May 31, 1986, pp. 43-44.

Wu et al., "Guide for Selecting Welding Wire (Second Edition)", Jun. 30, 2011, p. 45.

Wu et al., "Welding Technology", Jul. 31, 2002, pp. 133-135.

Palmer et al., "Subsea Pipeline Engineering (Second Edition)", Aug. 31, 2013, p. 46.

Huang et al., "Corrosion Resistance and Corrosion Data of Materials", Jan. 31, 2003, p. 19.

Wen et al., "Development Technology of Welding Rod", Jun. 30, 2001, pp. 69-72.

Xue et al., "Manual of Welding Materials", Jan. 31, 2006, pp. 10-11.

Office Action in CN Patent Application No. 201480055868.2, Mar. 15, 2018 (along with English language machine translation of Office Action).

* cited by examiner

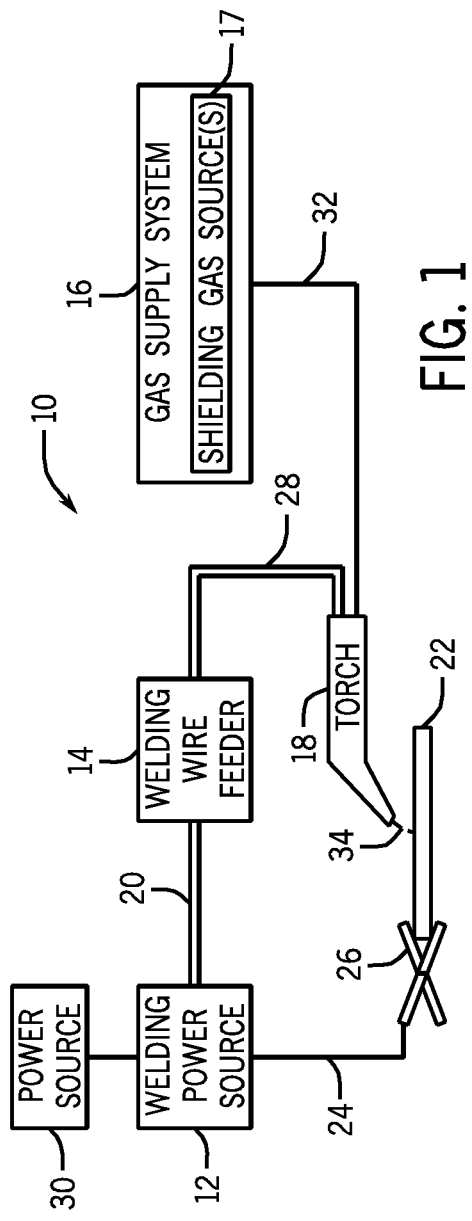
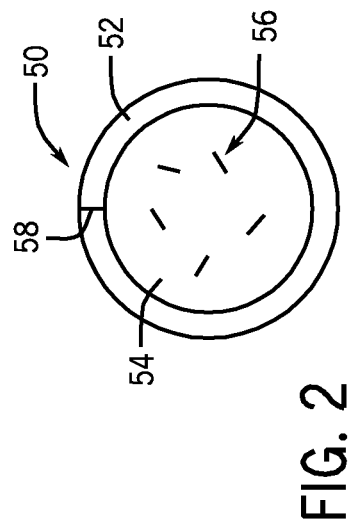
FIG. 1
FIG. 2

SYSTEMS AND METHODS FOR CORROSION-RESISTANT WELDING ELECTRODES

CROSS-REFERENCE

This application claims priority from and the benefit of U.S. Provisional Application Ser. No. 61/888,965, entitled "SYSTEMS AND METHODS FOR CORROSION-RESISTANT WELDING ELECTRODES", filed Oct. 9, 2013, U.S. Provisional Application Ser. No. 62/054,818, entitled "SYSTEMS AND METHODS FOR CORROSION-RESISTANT WELDING ELECTRODES", filed Sep. 24, 2014, which are hereby incorporated by reference in their entireties for all purposes.

BACKGROUND

The invention relates generally to welding and, more specifically, to electrodes for arc welding, such as Gas Metal Arc Welding (GMAW) or Flux Core Arc Welding (FCAW).

Welding is a process that has become ubiquitous in various industries for a variety of applications. For example, welding is often used in applications such as shipbuilding, offshore platform, construction, pipe mills, and so forth. Certain welding techniques (e.g., Gas Metal Arc Welding (GMAW), Gas-shielded Flux Core Arc Welding (FCAW-G), and Gas Tungsten Arc Welding (GTAW)), typically employ a shielding gas (e.g., argon, carbon dioxide, or oxygen) to provide a particular local atmosphere in and around the welding arc and the weld pool during the welding process, while others (e.g., Flux Core Arc Welding (FCAW), Submerged Arc Welding (SAW), and Shielded Metal Arc Welding (SMAW)) do not. Additionally, certain types of welding may involve a welding electrode in the form of welding wire. Welding wire may generally provide a supply of filler metal for the weld as well as provide a path for the current during the welding process. Furthermore, certain types of welding wire (e.g., tubular welding wire) may include one or more components (e.g., flux, arc stabilizers, or other additives) that may generally alter the welding process and/or the properties of the resulting weld.

BRIEF DESCRIPTION

In an embodiment, a tubular welding wire has a sheath and a core, and the tubular welding wire includes an organic stabilizer component, a rare earth component, and a corrosion resistant component comprising one or more of: nickel, chromium, and copper.

In an embodiment, a corrosion resistant weld deposit is formed on a coated workpiece. The weld deposit includes between approximately 0.5% and approximately 21% chromium by weight, between approximately 0.02% and approximately 12% nickel by weight, and between approximately 0.05% and approximately 1% copper by weight. Additionally, the weld deposit has a porosity less than approximately 0.25 inches per inch of the weld deposit.

In an embodiment, a method of manufacturing a tubular welding wire includes disposing a core within a metallic sheath. The core includes an organic stabilizer component including a sodium or potassium salt of an organic molecule or an organic polymer. The core includes a rare earth component including one or more elements or compounds of the lanthanide series. The core also includes an agglomerate having oxides of one or more of: potassium, sodium, silicon, titanium, and manganese. The core further includes a corrosion resistant component including one or more of: nickel, chromium, and copper. The method also includes compressing the metallic sheath around the core to form the tubular welding wire.

DRAWINGS

These and other features, aspects, and advantages of the present invention will become better understood when the following detailed description is read with reference to the accompanying drawings in which like characters represent like parts throughout the drawings, wherein:

FIG. 1 is a block diagram of a gas metal arc welding (GMAW) system, in accordance with embodiments of the present disclosure;

FIG. 2 is a cross-sectional view of a tubular welding wire, in accordance with embodiments of the present disclosure;

DETAILED DESCRIPTION

Figure 3:
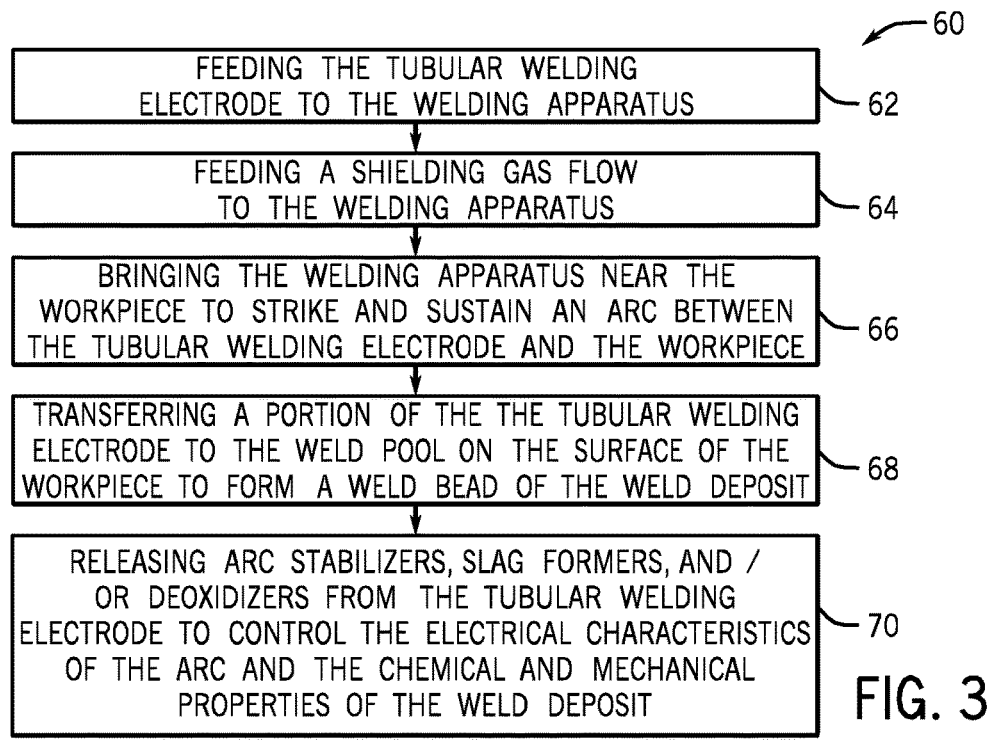
FIG. 3 is a process by which the tubular welding wire may be used to weld a workpiece, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be appreciated that, as used herein, the term "tubular welding electrode" or "tubular welding wire" may refer to any welding wire or electrode having a metal sheath and a granular or powdered core, such as metal-cored or flux-cored welding electrodes. It should also be appreciated that the term "stabilizer" or "additive" may be generally used to refer to any component of the tubular welding that improves the quality of the arc, the quality of the weld, or otherwise affect the welding process. Furthermore, as used herein, "approximately" may generally refer to an approximate value that may, in certain embodiments, represent a difference (e.g., higher or lower) of less than 0.01%, less than 0.1%, or less than 1% from the actual value. That is, an "approximate" value may, in certain embodiments, be accurate to within (e.g., plus or minus) 0.01%, within 0.1%, or within 1% of the stated value. As used herein, a "stainless steel" is any steel that includes at least 10.5% chromium by weight and at least 50% iron by weight. A non-limiting list of example stainless steels include: 200 series stainless steel, 300 series stainless steel, and 400 series stainless steel.

As mentioned, certain types of welding electrodes (e.g., tubular welding wire) may include one or more components (e.g., flux, arc stabilizers, or other additives) that may generally alter the welding process and the properties of the resulting weld. For example, certain presently disclosed welding electrode embodiments include one or more corrosion resistant components (e.g., nickel, chromium, copper, and/or alloys or mixtures thereof) that may enable a weld deposit to have enhanced or improved resistance to corrosion or oxidation. Additionally, certain presently disclosed welding electrode embodiments include an organic stabilizer (e.g., a derivatized cellulose-based component) that may generally improve the stability of the arc while providing a reducing atmosphere conducive to welding coated workpieces (e.g., galvanized or nitrided workpieces). As used herein, an "organic stabilizer" may refer to an organic salt or organometallic compound having an organic portion (e.g., a carbon-based molecule or polymer chain) and a stabilizer portion (e.g., a Group I/II metal ion). Certain presently disclosed welding electrode embodiments also include a rare earth component (e.g., a lanthanide alloys, lanthanide silicides) that may generally help to control the shape and penetration of the arc during welding. In certain embodiments, a metal sheath having lower carbon content may be used to provide, for example, a lower spatter rate, reduced welding fumes, and/or reduced penetration into the workpiece during welding. Furthermore, in certain embodiments, the disclosed tubular welding wire may have a suitable composition to enable the formation of a weld deposit with a relatively high chromium content (e.g., 4-6 wt % chromium), which may hold nitrogen in solution within the weld deposit to mitigate or prevent weld porosity. It may be appreciated that is especially useful to provide low porosity weld deposits (e.g., a porosity less than approximately 0.25 inches or less than approximately 0.10 inches per inch of weld) when welding workpieces that have a high nitrogen content (e.g., nitrided steel).

Accordingly, in certain embodiments, the presently disclosed tubular welding wires enhance the weldability of coated (e.g., galvanized, galvannealed, aluminized, nitrided, painted, and so forth) workpieces and/or thinner (e.g., 20-, 22-, 24-gauge, or thinner) workpieces, even at high travel speed (e.g., greater than 30 in/min or greater than 40 in/min). Further, when a corrosion resistant weld is desirable, the aforementioned corrosion resistant components (e.g., nickel, chromium, copper, and/or alloys or mixtures thereof) within the sheath and/or the core of certain embodiments of the disclosed tubular welding wires may improve the corrosion resistance of the weld deposit relative to a mild steel weld deposit. In certain embodiments, the sheath of the disclosed tubular welding wires may be a corrosion resistant sheath, such as a stainless steel sheath (e.g., 304, 409, 410, or 430 stainless steel) as defined by the American Welding Society (AWS) A5.22. Additionally, in certain embodiments, the corrosion resistant weld deposit formed by the disclosed tubular welding wires may be stainless weld deposits (e.g., 304, 409, 410, or 430 stainless steel), in accordance with AWS A5.22. The improved corrosion resistance enabled by certain embodiments of the disclosed tubular welding wires may either obviate or supplement certain post-weld process steps, such as preparing and coating (e.g., zinc plating) the weld deposit after deposition. Additionally, certain presently disclosed tubular welding wires may be drawn to particular diameters (e.g., 0.024 in, 0.030 in, 0.035 in, 0.0375 in, 0.040 in, or other suitable diameters) to provide good heat transfer and deposition rates and/or to enable the welding of thinner workpieces.

Turning to the figures, FIG. 1 illustrates an embodiment of a gas metal arc welding (GMAW) system 10 that utilizes a welding electrode (e.g., tubular welding wire) in accordance with the present disclosure. It should be appreciated that, while the present discussion may focus specifically on the GMAW system 10 illustrated in FIG. 1, the presently disclosed welding electrodes may benefit any arc welding process (e.g., FCAW, FCAW-G, GTAW, SAW, SMAW, or similar arc welding process) that uses a welding electrode. The welding system 10 includes a welding power source 12, a welding wire feeder 14, a gas supply system 16, and a welding torch 18. The welding power source 12 generally supplies power to the welding system 10 and may be coupled to the welding wire feeder 14 via a cable bundle 20 as well as coupled to a workpiece 22 using a lead cable 24 having a clamp 26. In the illustrated embodiment, the welding wire feeder 14 is coupled to the welding torch 18 via a cable bundle 28 in order to supply consumable, tubular welding wire (i.e., the welding electrode) and power to the welding torch 18 during operation of the welding system 10. In another embodiment, the welding power unit 12 may couple and directly supply power to the welding torch 18.

The welding power source 12 may generally include power conversion circuitry that receives input power from an alternating current power source 30 (e.g., an AC power grid, an engine/generator set, or a combination thereof), conditions the input power, and provides DC or AC output power via the cable 20. As such, the welding power source 12 may power the welding wire feeder 14 that, in turn, powers the welding torch 18, in accordance with demands of the welding system 10. The lead cable 24 terminating in the clamp 26 couples the welding power source 12 to the workpiece 22 to close the circuit between the welding power source 12, the workpiece 22, and the welding torch 18. The welding power source 12 may include circuit elements (e.g., transformers, rectifiers, switches, and so forth) capable of converting the AC input power to a direct current electrode positive (DCEP) output, direct current electrode negative (DCEN) output, DC variable polarity, pulsed DC, or a variable balance (e.g., balanced or unbalanced) AC output, as dictated by the demands of the welding system 10. It should be appreciated that the presently disclosed welding electrodes (e.g., tubular welding wire) may enable improvements to the welding process (e.g., improved arc stability and/or improved weld quality) for a number of different power configurations.

The illustrated welding system 10 includes a gas supply system 16 that supplies a shielding gas or shielding gas mixtures from one or more shielding gas sources 17 to the welding torch 18. In the depicted embodiment, the gas supply system 16 is directly coupled to the welding torch 18 via a gas conduit 32. In another embodiment, the gas supply system 16 may instead be coupled to the wire feeder 14, and the wire feeder 14 may regulate the flow of gas from the gas supply system 16 to the welding torch 18. A shielding gas, as used herein, may refer to any gas or mixture of gases that may be provided to the arc and/or weld pool in order to provide a particular local atmosphere (e.g., to shield the arc, improve arc stability, limit the formation of metal oxides, improve wetting of the metal surfaces, alter the chemistry of the weld deposit, and so forth). In certain embodiments, the shielding gas flow may be a shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow (e.g., delivered via the conduit 32) may include Ar, Ar/$CO_2$ mixtures (e.g., between 1% and 99% $CO_2$ in Ar), Ar/CO$_2$/O$_2$ mixtures, Ar/He mixtures, and so forth. By specific example, in certain embodiments, the shielding gas flow may include 100% Ar; 75% Ar and 25% CO$_2$; 90% Ar and 10% CO$_2$; or 98% Ar and 2% O$_2$.

Accordingly, the illustrated welding torch 18 generally receives the welding electrode (i.e., the tubular welding wire), power from the welding wire feeder 14, and a shielding gas flow from the gas supply system 16 in order to perform GMAW of the workpiece 22. During operation, the welding torch 18 may be brought near the workpiece 22 so that an arc 34 may be formed between the consumable welding electrode (i.e., the welding wire exiting a contact tip of the welding torch 18) and the workpiece 22. Additionally, as discussed below, by controlling the composition of the welding electrode (i.e., the tubular welding wire), the chemistry of the arc 34 and/or the resulting weld (e.g., composition and physical characteristics) may be varied. For example, the welding electrode may include fluxing or alloying components that may affect the welding process (e.g., act as arc stabilizers) and, further, may become at least partially incorporated into the weld, affecting the mechanical properties of the weld. Furthermore, certain components of the welding electrode (i.e., welding wire) may also provide additional shielding atmosphere near the arc, affect the transfer properties of the arc 34, deoxidize the surface of the workpiece, limit oxidation or corrosion in the weld deposit, and so forth.

A cross-section of an embodiment of the presently disclosed welding wire is illustrated in FIG. 2. FIG. 2 illustrates a tubular welding wire 50 that includes a metallic sheath 52, which encapsulates a granular or powdered core 54 (also referred to as filler). In certain embodiments, the tubular welding wire 50 may comply with one or more AWS standards. For example, in certain embodiments, the tubular welding wire 50 may be classified in accordance with AWS A5.18 ("SPECIFICATION FOR CARBON STEEL ELECTRODES AND RODS FOR GAS SHEILDED ARC WELDING"), or AWS A5.20 ("CARBON STEEL ELECTRODES FOR FLUX CORED ARC WELDING"), or AWS A5.29 ("SPECIFICATION FOR LOW ALLOY STEEL ELECTRODES FOR FLUX CORED ARC WELDING"), or AWS A5.36 ("SPECIFICATION FOR CARBON AND LOW-ALLOY STEEL FLUX CORED ELECTRODES FOR FLUX CORED ARC WELDING AND METAL CORED ELECTRODES FOR GAS METAL ARC WELDING"), or AWS A5.22 ("SPECIFICATION FOR STAINLESS STEEL FLUX CORED AND METAL CORED WELDING ELECTRODES AND RODS"), or another suitable AWS standard applicable to coated (e.g., galvanized, aluminized, nitrided, etc.) or uncoated mild steel, low-alloy steel, or weathering steel workpieces. Additionally, in certain embodiments, the disclosed tubular welding wire may not fall within an existing AWS standard. For example, in certain embodiments, the disclosed tubular welding wire may form martensitic weld deposits and, as such, may fall outside of an existing AWS standard. However, such tubular welding wire embodiments may be useful, for example, as a hard-facing type wire used to form hard-facing weld deposits. It may be appreciated that, for such embodiments, the resulting martensitic weld deposit may be subsequently heat treated (e.g., at approximately 1200° F. for approximately 1 hour or less) to improve the ductility of the weld deposit while still retaining its high strength. However, it may also be appreciated that such post-weld heat treatments may add time and cost to the welding operation and may cause deleterious distortions in certain types of workpieces.

In particular, certain embodiments of the tubular welding wire 50 may be capable of providing quality welds on coated (e.g., galvanized, aluminized, nitrided, etc.) and uncoated mild steel workpieces. It may be appreciated that the aforementioned corrosion resistant components (e.g., nickel, chromium, copper, and/or mixtures or alloys thereof) of the tubular welding wire 50 may enable the formation of corrosion resistant weld deposits, and thereby alleviate or obviate certain process steps (e.g., cleaning and coating the surface of the weld deposit). Further, elimination of such process steps may reduce welding process time and/or improve welding process efficiency. It may also be appreciated that, in certain embodiments, the tubular welding wire 50 may be designed for either single-pass or multi-pass welding operations. It may be appreciated that, generally speaking, single pass weld metal may be diluted by approximately 15% and 50% by the base material of the workpiece, and, accordingly, the composition of the tubular welding wire 50 may be adjusted in order to provide particular target concentrations of the corrosion resistant components in the resulting weld deposit for a particular type (e.g., single pass or multi-pass) of welding operation. By specific example, in certain embodiments, the tubular welding wire 50 may be capable of achieving a weld deposit having ferritic stainless chemistry, in which a minimum chromium level (e.g., at least 2.5% chromium by weight of the weld deposit) may be provided to the weld deposit using a single pass welding operation to result in a corrosion resistant weld deposit on coated (e.g., galvanized, aluminized, nitrided) or uncoated mild steel workpieces, including workpieces having thicknesses of 0.3 inches or less (e.g., gauge thicknesses).

The metallic sheath 52 of the tubular welding wire 50 illustrated in FIG. 2 may be manufactured from any suitable metal or alloy, such as steel. It should be appreciated that the composition of the metallic sheath 52 may affect the composition of the resulting weld and/or the properties of the arc 34. In certain embodiments, the metallic sheath 52 may account for between approximately 80% and 90% of the total weight of the tubular welding wire 50. For example, in certain embodiments, the metallic sheath 52 may provide or account for between approximately 84% and approximately 86% of the total weight of the tubular welding wire 50. As mentioned, in certain embodiments, the metallic sheath 52 may be manufactured from 304, 409, 410, or 430 stainless steel, as defined by AWS A5.22.

In certain embodiments, the metallic sheath 52 may include certain additives or impurities (e.g., alloying components, carbon, alkali metals, manganese, or similar compounds or elements) that may be selected to provide desired weld properties. For example, in certain embodiments, the metallic sheath 52 of the tubular welding wire 50 may be a low-carbon strip that includes a relatively small (e.g., lower or reduced) amount of carbon. In certain embodiments, the carbon content of the metallic sheath 52 may account for less than approximately 0.01%, less than approximately 0.02%, less than approximately 0.03%, less than approximately 0.04%, less than approximately 0.05%, less than approximately 0.06%, less than approximately 0.07%, less than approximately 0.08%, less than approximately 0.09%, or less than approximately 0.1% of the weight of the entire tubular welding wire 50. Additionally, in certain embodiments, the metallic sheath 52 may be made of steel (e.g., low-carbon steel) generally having a small number of inclusions. For example, in certain embodiments, the manganese content of the metallic sheath 52 may account for between approximately 0.25% and approximately 0.5%, or approximately 0.34% or approximately 0.35% manganese of the weight of the tubular welding wire 50. By further example, in certain embodiments, the metallic sheath 52 may have a phosphorus content that is less than approximately 0.02% of the total weight of the tubular welding wire 50 and/or a sulfur content that is less than approximately 0.02% of the total weight of the tubular welding wire 50. The metallic sheath 52, in certain embodiments, may also provide less a silicon content that is less than approximately 0.04% of the weight of the tubular welding wire 50, an aluminum content that is less than approximately 0.05% of the weight of the tubular welding wire 50, a copper content that is less than approximately 0.1% of the weight of the tubular welding wire 50, and/or a tin content that is less than approximately 0.02% of the weight of the tubular welding wire 50. Accordingly, in certain embodiments, the iron content of the metallic sheath 52 may account for more than approximately 80% (e.g., 84%, 85%) of the weight of the tubular welding wire 50. As mentioned above, in certain embodiments, one or more of the corrosion resistant components (e.g., nickel, chromium, copper) may be incorporated into the metallic sheath 52 in alternative or in addition to the granular core 54.

The granular core 54 of the illustrated tubular welding wire 50 may generally be a compacted powder. In certain embodiments, the granular core 54 may account for between approximately 5% and approximately 40% or between approximately 10% and approximately 20% of the total weight of the tubular welding wire 50. For example, in certain embodiments, the granular core 54 may provide approximately 14%, approximately 15%, approximately 16%, or approximately 20% of the total weight of the tubular welding wire 50. Furthermore, in certain embodiments, the components of the granular core 54, discussed below, may be homogenously or non-homogenously (e.g., in clumps or clusters 56) disposed within the granular core 54. For example, the granular core 54 of certain flux-cored and metal-cored welding electrode embodiments may include one or more metals (e.g., iron, iron titanium, iron silicon, or other alloys or metals) that may provide at least a portion of the filler metal for the weld deposit. By specific example, in certain embodiments, the granular core 54 may include between approximately 0% and approximately 60% iron powder, as well as other alloying components, such as ferro-titanium (e.g., 40% grade), ferro-magnesium-silicon, and ferro-silicon powder (e.g., 50% grade, unstabilized). Other examples of components that may be present within the tubular welding wire 50 (i.e., in addition to the one or more carbon sources and the one or more alkali metal and/or alkali earth metal compounds) include other stabilizing, fluxing, and alloying components, such as may be found in METALLOY X-CEL™ welding electrodes available from Illinois Tool Works Inc.

In certain embodiments of the tubular welding wire 50, the total percentage of the combination of the one or more carbon sources and the one or more alkali metal and/or alkali earth metal compounds may be between approximately 0.01% and approximately 10% by weight, relative to the granular core 54 or the entire tubular welding wire 50. For example, in certain embodiments, the total percentage of the combination of the one or more carbon sources and the one or more alkali metal and/or alkali earth metal may be between approximately 0.01% and approximately 8%, between approximately 0.05% and approximately 5%, or between approximately 0.1% and approximately 4% of the granular core 54 or of the tubular welding wire 50 by weight. By specific example, in certain embodiments, the granular core 54 may include a carbon source and a potassium source that together account for approximately 10% or less of the granular core 54 by weight. It should be appreciated that, under the conditions of the arc 34, the components of the welding wire 50 (e.g., the metal sheath 52, the granular core 54, and so forth) may change physical state, chemically react (e.g., oxidize, decompose, and so forth), or become incorporated into the weld substantially unmodified by the weld process.

In certain embodiments, the tubular welding wire 50 may include (e.g., in the metallic sheath 52 and/or the granular core 54) one or more metals or alloys that may limit, block, or prevent corrosion within the weld deposit after deposition. For example, in certain embodiments, the metallic sheath 52 and/or the granular core 54 may include one or more of nickel (Ni), chromium (Cr), copper (Cu), and mixtures or alloys thereof, that may limit corrosion of the weld deposit by reactive species, such as oxygen. By specific example, in certain embodiments, chromium may account for between approximately 0.1% and approximately 20%, between approximately 0.2% and approximately 18%, between approximately 0.3% and approximately 17%, between approximately 0.4% and approximately 16%, between approximately 0.5% and approximately 15.8%, approximately 0.6%, between approximately 4% and 6%, approximately 2.5%, or approximately 16% of the tubular welding wire 50 by weight. Further, in certain embodiments, chromium may account for between approximately 0.5% and approximately 90% or between approximately 4% and approximately 80% of the weight of the core 54. As mentioned, in certain embodiments, the tubular welding wire 50 may be designed to provide a weld deposit having a relatively high chromium content (e.g., a weld deposit having at least 3%, 4%, or 5% chromium by weight), to enable the formation of low porosity welds on base materials that are high in nitrogen (e.g., nitrided steel base materials).

By further example, in certain embodiments, nickel may account for between approximately 0% and approximately 5%, between approximately 0.1% and approximately 2.5%, between approximately 0.2% and approximately 2%, between approximately 0.3% and approximately 1%, between approximately 0.4% and approximately 0.8%, or approximately 0.6% of the tubular welding wire 50 by weight. In certain embodiments, nickel may account for between approximately 0.5% and approximately 10%, between approximately 1% and approximately 5%, or approximately 4% of the weight of the core 54. In certain embodiments, copper may account for between approximately 0% and approximately 2%, between approximately 0.1% and approximately 1%, between approximately 0.25% and approximately 0.9%, between approximately 0.3% and approximately 0.75%, or approximately 0.6% of the tubular welding wire 50 by weight. Further, in certain embodiments, copper may account for between approximately 0.5% and approximately 10%, between approximately 1% and approximately 5%, or approximately 4% of the weight of the core 54.

Additionally, in certain embodiments, molybdenum (Mo) may be present in the tubular welding wire 50 in order to capture carbon during the welding process, which may increase the availability of chromium for corrosion resistance. For example, in certain embodiments, molybdenum may be present in an amount that is approximately 40% of the amount of chromium (by weight) in the tubular welding wire 50. By specific example, in certain embodiments, molybdenum may account for between approximately 0.01% and approximately 5%, between approximately 0.02% and approximately 4%, between approximately 0.03% and approximately 3%, between approximately 0.05% and approximately 1.5%, between approximately 0.08% and approximately 1.2%, or approximately 0.09% of the tubular welding wire 50 by weight. In other embodiments, titanium or niobium may be used in lieu of molybdenum in similar amounts to provide a similar effect.

Additionally, presently disclosed embodiments of the tubular welding wire 50 may include an organic stabilizer disposed in the granular core 54. The organic stabilizer may be any organic molecule that includes one or more alkali metal ions (e.g., Group I: lithium (Li), sodium (Na), potassium (K), rubidium (Rb), cesium (Cs)) or alkali earth metal ions (e.g., Group II: beryllium (Be), magnesium (Mg), calcium (Ca), strontium (Sr), or barium (Ba)). That is, in certain embodiments, the organic stabilizer includes an organic subcomponent (e.g., an organic molecule or polymer), which includes carbon, hydrogen, and oxygen, and may be chemically (e.g., covalently or ionically) bonded to the alkali metal or alkali earth metal ions. In other embodiments, the organic stabilizer may include an organic subcomponent (e.g., an organic molecule or polymer, such as cellulose) that has been mixed with (e.g., not chemically bonded with) the alkali metal and/or alkali earth metal salt (e.g., potassium oxide, potassium sulfate, sodium oxide, etc.).

By specific example, in certain embodiments, the organic stabilizer may be a cellulose-based (e.g., cellulosic) component including a cellulose chain that has been derivatized to form a sodium or potassium salt (e.g., sodium or potassium carboxymethyl cellulose). For example, in certain embodiments, the cellulose-based organic stabilizer may be sodium carboxymethyl cellulose having a degree of substitution (DS) ranging from approximately 0.5 and approximately 2.5. In general, the DS of a derivatized cellulose may be a real number between 0 and 3, representing an average number of substituted hydroxyl moieties in each monomer unit of the polysaccharide. In other embodiments, the organic stabilizer may be other organic molecules that include one or more Group I/Group II ions. For example, in certain embodiments, the organic stabilizer may include derivatized sugars (e.g., derivatized sucrose, glucose, etc.) or polysaccharides having one or more carboxylic acids or sulfate moieties available to form an alkali metal or alkali earth metal salt. In other embodiments, the organic stabilizer may include soap-like molecules (e.g., sodium dodecyl sulfate or sodium stearate) or alginates. Additionally, in certain embodiments, the organic stabilizer may account for less than approximately 10%, between approximately 0.05% and approximately 5%, between approximately 0.1% and approximately 3%, between approximately 0.25% and approximately 2.5%, between approximately 0.5% and approximately 1.5%, approximately 0.75%, or approximately 1% of the granular core 54 by weight. Additionally, in certain embodiments, the organic stabilizer may account for less than approximately 5%, between approximately 0.05% and approximately 3%, between approximately 0.08% and approximately 2%, between approximately 0.1% and approximately 1%, or approximately 0.15% of the tubular welding wire 50 by weight.

It may be appreciated that the organic stabilizer component of the tubular welding wire 50 may be maintained at a suitable level such that a reducing environment (e.g., hydrogen-rich) may be provided near the welding arc, but without introducing substantial porosity into the weld. It should further be appreciated that utilizing an organic molecule as a delivery vehicle for at least a portion of the Group I/Group II ions to the welding arc, as presently disclosed, may not be widely used since organic molecules may generate hydrogen under the conditions of the arc, which may result in porous and/or weak welds for mild steels. However, as set forth below, using the presently disclosed organic stabilizers afford quality welds (e.g., low-porosity welds), even when welding at high travel speed on coated (e.g., galvanized, aluminized, nitrided) and/or thin workpieces.

Additionally, certain presently disclosed embodiments of the tubular welding wire 50 may also include a carbon component disposed in the granular core 54. For example, the carbon source present in the granular core 54 and/or the metal sheath 52 may be in a number of forms and may stabilize the arc 34 and/or increase the carbon content of the weld. For example, in certain embodiments, graphite, graphene, nanotubes, fullerenes and/or similar substantially $sp^2$-hybridized carbon sources may be utilized as the carbon source in the tubular welding wire 50. Furthermore, in certain embodiments, graphene or graphite may be used to also provide other components (e.g., moisture, gases, metals, and so forth) that may be present in the interstitial space between the sheets of carbon. In other embodiments, substantially $sp^3$-hybridized carbon sources (e.g., micro- or nano-diamond, carbon nanotubes, buckyballs) may be used as the carbon source. In still other embodiments, substantially amorphous carbon (e.g., carbon black, lamp black, soot, and/or similar amorphous carbon sources) may be used as the carbon source. Furthermore, while the present disclosure may refer to this component as a "carbon source," it should be appreciated that the carbon source may be a chemically modified carbon source that may contain elements other than carbon (e.g., oxygen, halogens, metals, and so forth). For example, in certain embodiments, the tubular welding wire 50 may include a carbon black component in the granular core 54 that may contain a manganese content of approximately 20%. In certain embodiments, the carbon component of the tubular welding wire 50 may be powdered or granular graphite.

In certain embodiments, the carbon component may account for between approximately 0.01% and approximately 9.9%, between approximately 0.05% and approximately 5%, between approximately 0.1% and approximately 3%, between approximately 0.25% and approximately 2%, between approximately 0.4% and approximately 1%, or approximately 0.5% of the granular core 54 by weight. Additionally, in certain embodiments, the carbon component may account for less than approximately 10%, between approximately 0.01% and approximately 5%, between approximately 0.05% and approximately 2.5%, between approximately 0.1% and approximately 1%, or approximately 0.5% of the granular core 54 by weight. In certain embodiments, the carbon component may account for less than approximately 5%, between approximately 0.01% and approximately 2.5%, between approximately 0.05% and approximately 0.1%, or approximately 0.08% of the tubular welding wire 50 by weight. In certain embodiments, the granular core 54 may not include a carbon component.

Furthermore, in addition to the organic stabilizer discussed above, the tubular welding wire 50 may also include one or more inorganic stabilizers to further stabilize the arc 34. That is, the granular core 54 of the tubular welding wire 50 may include one or more compounds of the Group 1 and Group 2 elements (e.g., Li, Na, K, Rb, Cs, Be, Mg, Ca, Sr, Ba). A non-limiting list of example compounds include: Group 1 (i.e., alkali metal) and Group 2 (i.e., alkaline earth metal) silicates, titanates, manganese titanate, alginates, carbonates, halides, phosphates, sulfides, hydroxides, oxides, permanganates, silicohalides, feldspars, pollucites, molybdenites, and molybdates. For example, in an embodiment, the granular core 54 of the tubular welding wire 50 may include potassium manganese titanate, potassium sulfate, sodium feldspar, potassium feldspar, and/or lithium carbonate. By specific example, the granular core 54 may include potassium silicate, potassium titanate, potassium alginate, potassium carbonate, potassium fluoride, potassium phosphate, potassium sulfide, potassium hydroxide, potassium oxide, potassium permanganate, potassium silicofluoride, potassium feldspar, potassium molybdates, or a combination thereof as the potassium source. In certain embodiments, the one or more alkali metal and/or alkaline earth metal compounds may include Group 1 and Group 2 salts of carboxymethyl cellulose (e.g., sodium carboxymethyl cellulose or potassium carboxymethyl cellulose). Similar examples of stabilizing compounds that may be used are described in U.S. application Ser. No. 13/596,713, entitled "SYSTEMS AND METHODS FOR WELDING ELECTRODES," and U.S. Pat. No. 7,087,860, entitled "STRAIGHT POLARITY METAL CORED WIRES," and U.S. Pat. No. 6,723,954, entitled "STRAIGHT POLARITY METAL CORED WIRE," which are incorporated by reference in their entireties for all purposes.

Furthermore, for certain embodiments of the presently disclosed tubular welding wire 50, one or more inorganic stabilizers may be included in the granular core 54 in the form of an agglomerate or frit. That is, certain embodiments of the tubular welding wire 50 may include one or more of the inorganic stabilizers described above in an agglomerate or frit that may stabilize the arc during welding. The term "agglomerate" or "frit," as used herein, refers to a mixture of compounds that have been fired or heated in a calciner or oven such that the components of the mixture are in intimate contact with one another. It should be appreciated that the agglomerate may have subtly or substantially different chemical and/or physical properties than the individual components of the mixture used to form the agglomerate. For example, agglomerating, as presently disclosed, may provide a frit that is better suited for the weld environment than the non-agglomerated materials.

In certain embodiments, the granular core 54 of the tubular welding wire 50 may include an agglomerate or frit of one or more alkali metal or alkaline earth metal compounds (e.g., potassium oxide, sodium oxide, calcium oxide, magnesium oxide, or other suitable alkali metal or alkaline earth metal compound). In other embodiments, the granular core 54 of the tubular welding wire 50 may include an agglomerate of a mixture of alkali metal or alkaline earth metal compound and other oxides (e.g., silicon dioxide, titanium dioxide, manganese dioxide, or other suitable metal oxides). For example, one embodiment of a tubular welding wire 50 may include an agglomerated potassium source including of a mixture of potassium oxide, silica, and titania. By further example, another embodiment of a tubular welding wire 50 may include in the granular core 54 another stabilizing agglomerate having a mixture of potassium oxide (e.g., between approximately 22% and 25% by weight), silicon oxide (e.g., between approximately 10% and 18% by weight), titanium dioxide (e.g., between approximately 38% and 42% by weight), and manganese oxide or manganese dioxide (e.g., between approximately 16% and 22% by weight). In certain embodiments, an agglomerate may include between approximately 5% and 75% alkali metal and/or alkaline earth metal compound (e.g., potassium oxide, calcium oxide, magnesium oxide, or other suitable alkali metal and/or alkaline earth metal compound) by weight, or between approximately 5% and 95% alkali metal and/or alkaline earth metal (e.g., potassium, sodium, calcium, magnesium, or other suitable alkali metal and/or alkaline earth metal) by weight. Furthermore, in certain embodiments, other chemical and/or physical factors (e.g., maximizing alkali metal and/or alkaline earth metal loading, acidity, stability, and/or hygroscopicity of the agglomerate) may be considered when selecting the relative amounts of each component present in the agglomerate mixture. In certain embodiments, the agglomerate may account for between approximately 0.01% and approximately 9.9%, between approximately 0.05% and approximately 5%, between approximately 0.1% and approximately 4%, between approximately 1% and approximately 3%, between approximately 1.5% and approximately 2.5%, or approximately 2% of the granular core 54 by weight. Additionally, in certain embodiments, the agglomerate may account for less than approximately 10%, between approximately 0.1% and approximately 6%, between approximately 0.25% and approximately 2.5%, between approximately 0.5% and approximately 1.5%, approximately 1%, or approximately 0.75% of the granular core 54 by weight. In certain embodiments, the agglomerate may account for less than approximately 5%, between approximately 0.05% and approximately 2.5%, between approximately 0.1% and approximately 0.5%, or approximately 0.75% of the tubular welding wire 50 by weight.

Additionally, the granular core 54 of the tubular welding wire 50 may also include other components to control the welding process. For example, rare earth elements may generally affect the stability and heat transfer characteristics of the arc 34. As such, in certain embodiments, the tubular welding wire 50 may include a rare earth component, such as the Rare Earth Silicide (e.g., available from Miller and Company of Rosemont, Ill.), which may include rare earth elements (e.g., elements of the lanthanide series), non-rare earth elements (e.g., iron and silicon), and compounds thereof (e.g., cerium silicide, lanthanum silicide, etc.). In other embodiments, any lanthanide element, alloy, or compound (e.g., cerium silicide, lanthanum silicide, nickel lanthanum alloys, etc.) may be used in an amount that does not negate the effect of the present approach. By specific example, in certain embodiments, the rare earth component may account for less than approximately 10%, between approximately 0.01% and approximately 8%, between approximately 0.5% and approximately 5%, between approximately 0.25% and approximately 4%, between approximately 1% and approximately 3%, between approximately 0.75% and approximately 2.5%, approximately 2%, or approximately 1.5% of the granular core 54 by weight. In certain embodiments, the rare earth component may account for less than approximately 5%, between approximately 0.01% and approximately 2.5%, between approximately 0.1% and approximately 0.75%, or approximately 0.3% of the tubular welding wire 50 by weight.

Furthermore, the tubular welding wire 50 may, additionally or alternatively, include other elements and/or minerals to provide arc stability and to control the chemistry of the resulting weld. For example, in certain embodiments, the granular core 54 and/or the metallic sheath 52 of the tubular welding wire 50 may include certain elements (e.g., titanium, manganese, zirconium, fluorine, or other elements) and/or minerals (e.g., pyrite, magnetite, and so forth). By specific example, certain embodiments may include zirconium silicide, nickel zirconium, or alloys of titanium, aluminum, and/or zirconium in the granular core 54. In particular, sulfur containing compounds, including various sulfide, sulfate, and/or sulfite compounds (e.g., such as molybdenum disulfide, iron sulfide, manganese sulfite, barium sulfate, calcium sulfate, or potassium sulfate) or sulfur-containing compounds or minerals (e.g., pyrite, gypsum, or similar sulfur-containing species) may be included in the granular core 54 to improve the quality of the resulting weld by improving bead shape and facilitating slag detachment, which may be especially useful when welding galvanized workpieces, as discussed below. Furthermore, in certain embodiments, the granular core 54 of the tubular welding wire 50 may include multiple sulfur sources (e.g., manganese sulfite, barium sulfate, and pyrite), while other embodiments of the tubular welding wire 50 may include only a single sulfur source (e.g., potassium sulfate) without including a substantial amount of another sulfur source (e.g., pyrite or iron sulfide). For example, in an embodiment, the granular core 54 of the tubular welding wire 50 may include between approximately 0.01% and approximately 0.5%, or approximately 0.15% or 0.2% potassium sulfate by weight of the granular core 54.

Generally speaking, the tubular welding wire 50 may generally stabilize the formation of the arc 34 to the workpiece 22. As such, the disclosed tubular welding wire 50 may improve more than one aspect of the welding process (e.g., deposition rate, travel speed, splatter, bead shape, weld quality, etc.). It should further be appreciated that the improved stability of the arc 34 may generally enable and improve the welding of coated metal workpieces and thinner workpieces. For example, in certain embodiments, the coated metal workpieces may include galvanized, galvannealed (e.g., a combination of galvanization and annealing), or similar zinc-coated workpieces. A non-limiting list of example coated workpieces further includes painted, sealed, dipped, plated (e.g., nickel-plated, copper-plated, tin-plated, or electroplated or chemically plated using a similar metal), chromed, nitrided, aluminized, or carburized workpieces. For example, in the case of galvanized workpieces, the presently disclosed tubular welding wire 50 may generally improve the stability and control the penetration of the arc 34 such that a good weld may be achieved despite the zinc coating on the outside of the workpiece 22. Additionally, by improving the stability of the arc 34, the disclosed tubular welding wire 50 may generally enable the welding of thinner workpieces than may be possible using other welding electrodes. For example, in certain embodiments, the disclosed tubular welding wire 50 may be used to weld metal having an approximately 14-, 16-, 18-, 20-, 22-, 24-gauge, or even thinner workpieces. For example, in certain embodiments, the disclosed tubular welding wire 50 may enable welding workpieces having a thickness less than approximately 5 mm, less than 3 mm, less than approximately 1.5 mm, less than approximately 1.27 mm (e.g., approximately 0.05 inches), less than approximately 1.11 mm (e.g., approximately 0.0438 inches), or at approximately 1 mm (e.g., approximately 0.0375 inches).

Furthermore, the presently disclosed tubular welding wire 50 enables welding (e.g., welding of thin gauge galvanized steels) at travel speeds in excess of 30 or even 40 inches per minute. For example, the tubular welding wire 50 readily enables high quality fillet welds at travel speeds above 40 inches per minute (e.g., 35 or 45 inches per minute) with low weld porosity. That is, the presently disclosed tubular welding wire 50 may enable higher (e.g., 50% to 75% higher) travel speeds than other solid-cored, metal-cored, or flux-cored welding wires. It should be appreciated that higher travel speeds may enable higher production rates (e.g., on a production line) and reduce costs. Additionally, the presently disclosed tubular welding wire 50 exhibits good gap handling and provides excellent weld properties (e.g., strength, ductility, appearance, and so forth) using a wide operating process window. Further, the tubular welding wire 50 generally produces less smoke and spatter than other solid-cored, metal-cored, or flux-cored welding wires.

Furthermore, the disclosed tubular welding wire 50 may also be combined with certain welding methods or techniques (e.g., techniques in which the welding electrode moves in a particular manner during the weld operation) that may further increase the robustness of the welding system 10 for particular types of workpieces. For example, in certain embodiments, the welding torch 18 may be configured to cyclically or periodically move the electrode in a desired pattern (e.g., a circular, spin arc, or serpentine pattern) within the welding torch 18 in order to maintain an arc 34 between the tubular welding wire 50 and the workpiece 22 (e.g., only between the sheath 52 of the tubular welding wire 50 and the workpiece 22). By specific example, in certain embodiments, the disclosed tubular welding wire 50 may be utilized with welding methods such as those described in U.S. Provisional Patent Application Ser. No. 61/576,850, entitled "DC ELECTRODE NEGATIVE ROTATING ARC WELDING METHOD AND SYSTEM,"; in U.S. patent application Ser. No. 13/681,687, entitled "DC ELECTRODE NEGATIVE ROTATING ARC WELDING METHOD AND SYSTEM"; and in U.S. Provisional Patent Application Ser. No. 61/676,563, entitled "ADAPTABLE ROTATING ARC WELDING METHOD AND SYSTEM"; which are all incorporated by reference herein in their entireties for all purposes. It should be appreciated that such welding techniques may be especially useful when welding thin workpieces (e.g., having 20-, 22-, or 24-gauge thickness), as mentioned above.

FIG. 3 illustrates an embodiment of a process 60 by which a workpiece 22 may be welded using the disclosed welding system 10 and tubular welding wire 50. The illustrated process 60 begins with feeding (block 62) the tubular welding electrode 50 (i.e., the tubular welding wire 50) to a welding apparatus (e.g., welding torch 18). As set forth above, in certain embodiments, the tubular welding wire 50 may include, for example, one or more corrosion resistant components (e.g., nickel, chromium, copper, or mixtures or alloys thereof), organic stabilizer components (e.g., sodium carboxymethyl cellulose), and one or more rare earth components (e.g., rare earth silicide). Further, the tubular welding wire 50 may have an outer diameter between approximately 0.024 in and approximately 0.062 in, between approximately 0.030 in and approximately 0.060 in, between 0.035 in and approximately 0.052 in, or approximately 0.040 in. It may also be appreciated that, in certain embodiments, the welding system 10 may feed the tubular welding wire 50 at a suitable rate to enable a travel speed greater than 30 in/min or greater than 40 in/min.

Additionally, the process 60 includes providing (block 64) a shielding gas flow (e.g., 100% argon, 100% carbon dioxide, 75% argon/25% carbon dioxide, 90% argon/10% carbon dioxide, or similar shielding gas flow) near the contact tip of the welding apparatus (e.g., the contact tip of the torch 18). In other embodiments, welding systems may be used that do not use a gas supply system (e.g., such as the gas supply system 16 illustrated in FIG. 1) and one or more components (e.g., potassium carbonate) of the tubular welding wire 50 may decompose to provide a shielding gas component (e.g., carbon dioxide).

Next, the tubular welding wire 50 may be brought near (block 66) the workpiece 22 to strike and sustain an arc 34 between the tubular welding wire 50 and the workpiece 22. It should be appreciated that the arc 34 may be produced using, for example, a DCEP, DCEN, DC variable polarity, pulsed DC, balanced or unbalanced AC power configuration for the GMAW system 10. Once the arc 34 has been established to the workpiece 22, a portion of the tubular welding wire 50 (e.g., filler metals and alloying components) may be transferred (block 68) into the weld pool on the surface of the workpiece 22 to form a weld bead of a weld deposit. Meanwhile, the other components of the tubular welding wire 50 may be released (block 70) from the tubular welding wire 50 to serve as arc stabilizers, slag formers, and/or deoxidizers to control the electrical characteristics of the arc and the resulting chemical and mechanical properties of the weld deposit.

It is believed that, for certain embodiments, the Group I or Group II metals (e.g., potassium and sodium ions) of the organic stabilizer may generally separate from the organic stabilizer and provide a stabilization effect to the arc. Meanwhile, it is believed that the organic portion (e.g., comprising at least carbon and hydrogen, but possibly including oxygen) may decompose under the conditions of the arc to provide a reducing (e.g., rich in hydrogen) atmosphere at or near the welding site. Accordingly, while not desiring to be bound by theory, it is believed that the resulting reducing atmosphere, and in potential combination with the Group I/Group II stabilizing metals, the rare earth components, the semi-cyclical motion, and so forth, presently disclosed, provides a welding solution enabling high travel speeds and low-porosity, even when welding coated workpieces or performing gap fills. For example, in certain embodiments, the tubular welding wire 50 may generally enable the welding of thinner workpieces as well as painted, galvanized, galvannealed, plated, aluminized, nitrided, chromed, carburized, or other similar coated workpieces. For example, certain embodiments of the presently disclosed tubular welding wire 50 may enable welding workpieces having thicknesses less than 5 mm or less than 4 mm, or workpieces having thicknesses of approximately 1.3 mm or 1.2 mm, while maintaining relatively high travel speed (e.g., in excess of 30 in/min or in excess of 40 in/min) and low-porosity, even when performing gap fills (e.g., 1-3 mm gap fills).

Furthermore, it may be appreciated that, for embodiments in which corrosion resistance is desirable, the process 60 illustrated in FIG. 3 may not necessarily include additional processing steps to prepare and coat the weld deposit. That is, the corrosion resistant components of the tubular welding wire 50 may enable the formation of an as-welded corrosion resistant (e.g., rust or oxidation resistant) weld deposit that may obviate additional processing steps that are commonly used for coated workpieces. In other words, when welding a coated (e.g., galvanized, nitrided) workpiece using other welding electrodes, after formation of the weld deposit, the surface of the weld deposit and the workpiece may be cleaned, prepared to receive a coating, and then coated with the coating to provide corrosion resistance to the workpiece. For example, after formation of a weld deposit using other welding electrodes, the surface of the weld deposit and the workpiece may be cleaned with a wire brush and then plated with zinc or painted with a zinc-based spray paint.

It may be appreciated that the corrosion resistance afforded by the aforementioned additional processing steps may be limited by how well the operator cleans, prepares, and coats the workpiece. In contrast, after formation of a weld deposit using the presently disclosed tubular welding wire 50, the weld deposit will include at least a portion of the corrosion resistant components of the tubular welding wire 50, which provides corrosion resistance to the weld deposit while obviating the additional cleaning, preparing, and coating processing steps. However, it may also be appreciated that, in certain embodiments of the present approach, the corrosion resistant weld deposit formed using the disclosed tubular welding wire 50 may undergo the aforementioned cleaning, preparing, and coating processing steps to provide even greater corrosion resistance to the workpiece. In such circumstances, a corrosion resistant weld deposit may ensure that the weld deposit and/or workpiece maintains a level of corrosion resistance even if the operator does a relatively poor job cleaning, preparing, and/or coating the workpiece.

Figure 4:
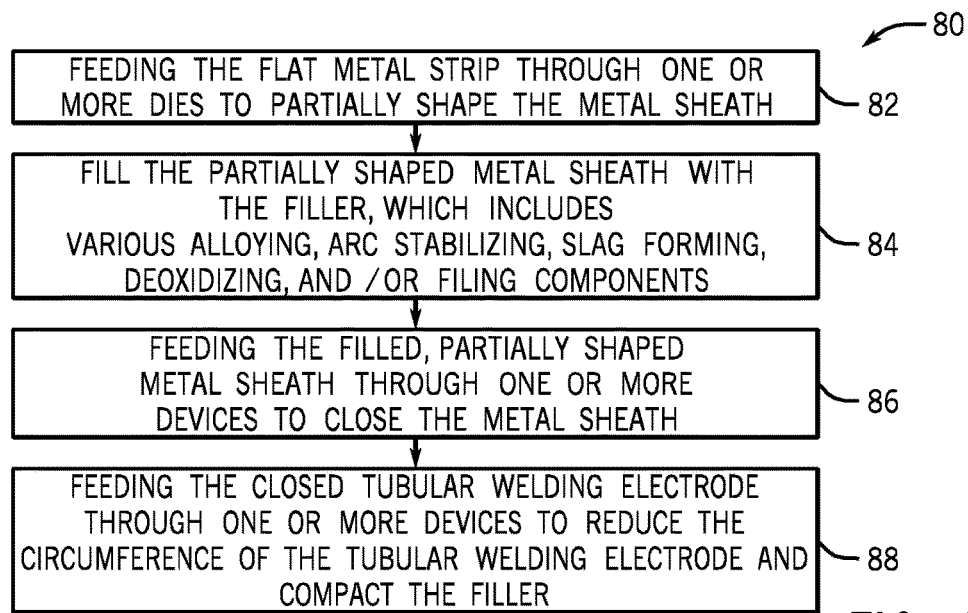
FIG. 4 is a process for manufacturing the tubular welding wire, in accordance with embodiments of the present disclosure.

FIG. 4 illustrates an embodiment of a process 80 by which the tubular welding wire 50 may be manufactured. It may be appreciated that the process 80 merely provides an example of manufacturing a tubular welding wire 50; however, in other embodiments, other methods of manufacturing may be used to produce the tubular welding wire 50 without negating the effect of the present approach. That is, for example, in certain embodiments, the tubular welding wire 50 may be formed via a roll-forming method or via packing the core composition into a hollow metallic sheath. The process 80 illustrated in FIG. 4 begins with a flat metal strip being fed (block 82) through a number of dies that shape the strip into a partially circular metal sheath 52 (e.g., producing a semi-circle or trough). After the metal strip has been at least partially shaped into the metal sheath 52, it may be filled (block 84) with the filler (e.g., the granular core 54). That is, the partially shaped metal sheath 52 may be filled with various powdered alloying, corrosion resisting, arc stabilizing, slag forming, deoxidizing, and/or filling components. For example, among the various fluxing and alloying components, one or more corrosion resistant components (e.g., nickel, chromium, copper, and/or alloys or combinations thereof), one or more organic stabilizer components (e.g., sodium carboxymethyl cellulose), one or more carbon components (e.g., graphite powder), and one or more rare earth components (e.g., rare earth silicide) may be added to the metal sheath 52. Furthermore, in certain embodiments, other components (e.g., rare earth silicide, magnetite, titanate, pyrite, iron powders, and/or other similar components) may also be added to the partially shaped metal sheath 52.

Next in the illustrated process 80, once the components of the granular core material 54 have been added to the partially shaped metal sheath 52, the partially shaped metal sheath 52 may then be fed through (block 86) one or more devices (e.g., drawing dies or other suitable closing devices) that may generally close the metal sheath 52 such that it substantially surrounds the granular core material 54 (e.g., forming a seam 58). Additionally, the closed metal sheath 52 may subsequently be fed through (block 88) a number of devices (e.g., drawing dies or other suitable devices) to reduce the circumference of the tubular welding wire 50 by compressing the granular core material 54. In certain embodiments, the tubular welding wire 50 may subsequently be heated to between approximately 300° F. and approximately 650° F. for approximately 4 to 6 hours prior to packaging the tubular welding wire onto a spool, reel, or drum for transport, while, in other embodiments, the tubular welding wire 50 may be packaged without this baking step.

Set forth below are five example formulations (E1, E2, E3, E4, and E5) for the tubular welding wire 50, in accordance with embodiments of the present approach. It may be appreciated that formulations E1-E5 discussed below are merely provided as examples and are not intended to limit the scope of the present approach. Table 1 includes the ingredients of the granular core 54 in weight percent relative to the weight of the granular core 54. Further, Table 1 includes the computed chemical composition of the metallic strip 52 and the granular core 54 for embodiments E1-E5 of the tubular welding wire 50, wherein values are provides as weight percent relative to the entire tubular welding wire 50. It may be appreciated that, for embodiments E1, E2, E4, and E5 of the tubular welding wire 50 set forth in Table 1, the granular core 54 may account for approximately 15% of the total weight of the tubular welding wire 50, while for embodiment E3, the granular core 54 may account for approximately 20% of the total weight of the tubular welding wire 50. Additionally, as set forth above, in certain embodiments, the tubular welding wire 50 may include one or more of chromium (e.g., 0.1% to 30% chromium by weight), copper (e.g., 0% to 1% copper by weight), and nickel (e.g., 0% to 10% nickel by weight), or any combination thereof, in order to provide a weld deposit that is substantially corrosion resistant.

It may be appreciated that the AWS A5.29 specification defines all-weld metal (AWM) deposit chemistry for a B classification and for a W2 classification, both of which provide greater corrosion resistance than typical mild steel chemistries. For example, the weld deposits of the B classification may be used in power plants for elevated temperature applications, while weld deposits of the W2 classification may be formed on weathering steel workpieces. As such, the AWS A5.29 specification is generally directed toward forming weld deposits on mild steel and/or low-alloy steel workpieces. It may also be appreciated that the AWS A5.22 specification defines AWM chemistry for single-pass stainless steel weld deposits (e.g., the 409 classification, the 304 classification, and the 308 classification) that provide adequate corrosion resistance without surface treatment on stainless workpieces. As such, while the AWS A5.29 and A5.22 specifications define corrosion resistant weld deposits, these standards do not directly address welding coated workpieces (e.g., galvanized, galvannealed, plated, aluminized, chromed, nitrided, carburized, or other similar coated workpieces). Accordingly, it may be appreciated that embodiment E1 of the tubular welding wire 50 may include similar corrosion resistant components as welding wires classified under the AWS A5.29 W2 classification, embodiment E2 of the tubular welding wire 50 may include a combination of corrosion resistant components used in welding wires classified under the AWS A5.29 W2 and/or B classifications. Additionally, embodiment E3 of the tubular welding wire 50 may include similar corrosion resistant components as welding wires classified under the AWS A5.22 409 classification, and embodiment E4 of the tubular welding wire 50 may include similar corrosion resistant components as welding wires classified under the AWS A5.22 308 classification. Additionally, embodiment E5 of the tubular welding wire 50 may include similar corrosion resistant components as welding wires classified under the AWS A5.22 B3 and/or W2 classifications. As such, in certain embodiments, the tubular welding wire 50 (e.g., embodiment E3) may be classified as A5.22 ECG welding wire (e.g., according to the classification system described in AWS A2.2.3-8) and may provide a ferritic stainless AWM chemistry on mild coated or uncoated steel workpieces of gauge thicknesses, wherein sufficient chromium is provided to the weld deposit during a single-pass welding operation (e.g., at approximately 15%-approximately 50% dilution) to impart corrosion resistance to the weld deposit. As mentioned above, in certain embodiments, the tubular welding wire 50 may not fall within an AWS classification (e.g., due to low ductility) and may form weld deposits that would receive post-weld heat treatment to impart the desired mechanical properties to the weld deposits.

For example, certain embodiments of the tubular welding wire 50 (e.g., E4) may enable the formation of an austenitic stainless weld deposit at approximately 30% dilution during a single-pass welding operation. Such an austenitic weld deposit may include corrosion resistant components similar to the AWS A5.22 308 or 304 classification (e.g., including between approximately 18% and approximately 21% chromium and between approximately 9% and 11% nickel). For this example, to provide the aforementioned levels of corrosion resistant components to the weld deposit, certain embodiments of the presently disclosed tubular welding wire 50 (e.g., E4) may include greater than approximately 20% (e.g., between approximately 25% and approximately 30%) chromium by weight and/or greater than approximately 10% (e.g., between approximately 12% and approximately 18%) nickel by weight of the tubular welding wire 50. Further, as illustrated in Table 1 below, certain embodiments of the tubular welding wire 50 (e.g., E4) may utilize a stainless steel strip (e.g., according to the AWS A5.22 304 classification) for the metallic sheath 52 of the tubular welding wire 50. By specific example, in certain embodiments, the metallic sheath 52 of the tubular welding wire 50 may include approximately 0.02% carbon, approximately 18.3% chromium, approximately 70% iron, approximately 1.85% manganese, and approximately 9.8% nickel by weight. Accordingly, for embodiments of the tubular welding wire 50 using a stainless steel metallic sheath 52, chromium (e.g., in the sheath 52 and the core 54) may account for between approximately 15% and approximately 30% of the weight of the tubular welding wire 50, and nickel (e.g., in the sheath 52 and the core 54) may account for between approximately 5% and approximately 10% of the weight of the tubular welding wire 50.

TABLE 1

Ingredients and calculated chemical composition of the metallic sheath 52 and the granular core 54 for embodiments E1-E5. Note that ingredients for the granular core 54 are provided in weight percent relative to the total granular core. Note that chemical composition values are computed values provided as weight percent relative to the total weight of the tubular welding wire 50. Further, the list of chemical composition list is not exhaustive and, as such, the amounts of each component may not sum up to unity. Ingredients of Granular Core (wt % relative to total weight of the core)

| Ingredient | E1 | E2 | E3 | E4 | E5 |
|---|---|---|---|---|---|
| Ferro-Molybdenum metal powder | 1 | 1 | 0 | 0 | 1 |
| Iron Powder | 57.6 | 40.8 | 0 | 0 | 21.9 |
| Potassium Sulfate | 0.2 | 0.2 | 0.15 | 0.2 | 0.2 |
| Rare Earth Silicide | 2 | 2 | 1.5 | 2 | 2 |
| Sodium carboxymethyl cellulose | 1 | 1 | 0.75 | 1 | 1 |
| K/Ti/Mn Frit | 1 | 1 | 0.75 | 1 | 1 |
| Nickel Metal Powder | 4 | 4 | 0 | 4 | 4 |
| Ferro-chromium low carbon metal powder | 5.7 | 22.5 | 0 | 0 | 22.5 |
| Ferro-titanium (40% grade) | 1.1 | 1.1 | 0.8 | 1.1 | 0 |
| Ferro-manganese-silicon | 17.1 | 17.1 | 12.8 | 17.1 | 17.1 |
| Copper Metal Powder | 4 | 4 | 0 | 0 | 4 |
| Graphite (granular) | 0.5 | 0.5 | 0 | 0.5 | 0.5 |
| Ferro-Silicon Powder | 4.8 | 4.8 | 3.6 | 4.8 | 4.8 |
| Chromium Metal Powder | 0 | 0 | 79.65 | 68.3 | 20 |
| Chemical Composition of Metallic Sheath (wt % relative to total weight of entire wire) | | | | | |
| Carbon | 0.0765 | 0.0765 | 0.072 | 0.017 | 0.0765 |
| Manganese | 0.34 | 0.34 | 0.32 | 1.5725 | 0.34 |

TABLE 1-continued

Ingredients and calculated chemical composition of the metallic sheath 52 and the granular core 54 for embodiments E1-E5. Note that ingredients for the granular core 54 are provided in weight percent relative to the total granular core. Note that chemical composition values are computed values provided as weight percent relative to the total weight of the tubular welding wire 50. Further, the list of chemical composition list is not exhaustive and, as such, the amounts of each component may not sum up to unity. Ingredients of Granular Core (wt % relative to total weight of the core)

| Ingredient | E1 | E2 | E3 | E4 | E5 |
|---|---|---|---|---|---|
| Iron | 84.5835 | 84.5835 | 79.61 | 59.5 | 84.5835 |
| Chromium | 0 | 0 | 0 | 15.555 | 0 |
| Nickel | 0 | 0 | 0 | 8.33 | 0 |

Chemical Composition of Granular Core (wt % relative to total weight of entire wire)

| | E1 | E2 | E3 | E4 | E5 |
|---|---|---|---|---|---|
| Aluminum | 0.0067 | 0.0069 | 0.0383 | 0.0271 | 0.0084 |
| Carbon | 0.2066 | 0.2055 | 0.1027 | 0.2044 | 0.2046 |
| Calcium | 0.0003 | 0.0003 | 0.0003 | 0.0003 | 0.0003 |
| Cobalt | 0.0015 | 0.0015 | 0 | 0.0015 | 0.0015 |
| Chromium | 0.6259 | 2.4705 | 15.7707 | 10.1426 | 5.4405 |
| Copper | 0.5958 | 0.5958 | 0 | 0 | 0.5958 |
| Iron | 9.5635 | 7.7141 | 0.7125 | 0.7000 | 4.8056 |
| Potassium Oxide | 0.0375 | 0.0375 | 0.0375 | 0.0375 | 0.0375 |
| Potassium Sulfate | 0.0288 | 0.0288 | 0.0288 | 0.0288 | 0.0288 |
| Lanthanides (Ln) | 0.0900 | 0.0900 | 0.0900 | 0.0900 | 0.0900 |
| Manganese | 1.5852 | 1.5852 | 1.5821 | 1.5820 | 1.5852 |
| Manganese Oxide | 0.0270 | 0.0270 | 0.0270 | 0.0270 | 0.0270 |
| Molybdenum | 0.0941 | 0.0941 | 0 | 0 | 0.0941 |
| Nitrogen | 0.0001 | 0.0001 | 0.0001 | 0.0001 | 0 |
| Nickel | 0.5970 | 0.5970 | 0 | 0.5970 | 0.5970 |
| Oxygen | 0.0004 | 0.0004 | 0.0004 | 0.0004 | 0 |
| Phosphorus | 0.0041 | 0.0039 | 0.0049 | 0.0038 | 0.0038 |
| Lead | 0.0003 | 0.0003 | 0 | 0 | 0.0003 |
| Sodium oxide | 0.1281 | 0.1281 | 0.0961 | 0.1281 | 0.1281 |
| Sulfur | 0.0009 | 0.0008 | 0.0036 | 0.0024 | 0.0011 |
| Silicon | 1.2220 | 1.2329 | 1.2487 | 1.2388 | 1.2378 |
| Silicon Dioxide | 0.0240 | 0.0240 | 0.0240 | 0.0240 | 0.0240 |
| Tin | 0.0003 | 0.0003 | 0 | 0 | 0.0003 |
| Titanium | 0.0672 | 0.0672 | 0.0651 | 0.0672 | 0 |
| Titanium Dioxide | 0.0615 | 0.0615 | 0.0615 | 0.0615 | 0.0615 |

Table 2 below includes example welding parameters that may be used when forming a weld deposit using the embodiments E1-E3 of the disclosed tubular welding wire 50. For example, weld deposits were formed from the tubular welding wire embodiments E1-E3 using robotic welder (e.g., a Miller Auto-Axcess 450 and a Motoman EA1400N robot arm) and a galvanized steel sheet metal workpiece according to the parameters set forth in Table 2. These example weld deposits did not show signs of burn-through and provided an acceptable surface appearance. Each of the embodiments E1-E3 provided good weldability as well as good feedability. Additionally, certain embodiments of the tubular welding wire 50 (e.g., E1) provided weld deposits exhibiting good ductility based on longitudinal bend tests (e.g., according to the testing procedure set forth in AWS A5.36 for single-pass butt-welds). Further, each of the embodiments E1-E5 are believed to provide sound weld deposits having a tensile strength greater than approximately 70 ksi.

For each the weld deposits formed according to the parameters of Table 2, the exterior of the weld deposits showed little or no external porosity, while the starts and stops of the welding operation showed some minor external porosity that is common in welding of galvanized coated materials. X-ray analysis of these weld deposits confirmed the presence of only minor internal porosity. Accordingly, it may be appreciated that the present approach enables low-porosity (e.g., a low surface porosity and/or low total porosity) welds to be attained at high travel speed (e.g., in excess of 30 in/min or 40 in/min), even when welding coated workpieces. In certain embodiments, the low-porosity enabled by the presently disclosed tubular welding wire 50 may provide a weld that is substantially non-porous. In other embodiments, the disclosed tubular welding wire 50 may provide a low-porosity weld having only small voids or pores (e.g., less than approximately 1.6 mm in diameter) that are separated from one another by a distance greater than or equal to the respective diameter of each pore. Further, in certain embodiments, the porosity may be represented as a sum of the diameters of the pores encountered per distance of the weld in a direction (e.g., along the weld axis). For such embodiments, the weld may have a porosity less than approximately 0.3 inches per inch of weld, less than approximately 0.25 inches per inch of weld, less than approximately 0.2 inches per inch of weld, or less than approximately 0.1 inches per inch of weld. In certain embodiments, the amount of chromium present in the tubular welding wire 50 may keep a substantial portion of the nitrogen present in the workpiece in solution to provide such low porosity welds, especially when welding workpieces having high nitrogen content (e.g., nitrided steel). It may be appreciated that the porosity of the weld may be measured using an X-ray analysis, microscope analysis, or another suitable method.

TABLE 2

Example welding parameters for a welding operation performed using embodiments E1-E3 of the tubular welding wire 50 on a galvanized workpiece.

| | E1 | E2 | E3 |
|---|---|---|---|
| Current | ~245 A | ~247 A | ~244 A |
| Voltage | 22 V | 22 V | 22 V |
| Wire Feed Speed | 270 in/min | 285 in/min | 285 in/min |
| Travel Speed | 40 in/min | 40 in/min | 40 in/min |
| Electrical Stick Out | 0.625 in | 0.625 in | 0.625 in |
| Shielding Gas Mixture | 90% Ar/10% $CO_2$ | 90% Ar/10% $CO_2$ | 90% Ar/10% $CO_2$ |

However, as mentioned above, certain embodiments of the tubular welding wire 50 may form weld deposits that initially have high strength, but also have relatively low ductility and toughness. By way of example, in a single (e.g., 1+1) pass butt weld test, an embodiment of the tubular welding wire 50 (e.g., E5) was used to form a weld deposit using an flux-cored arc welding process (e.g., current: ~280 A, voltage: 28 V, travel speed: approximately 12 in/min, electrical stickout: ⅞ in, shielding gas mixture: 90% Ar/10% $CO_2$). For this example, while the as-welded deposit may have sufficient strength (e.g., approximately 93,200 pounds per square inch (PSI)) to meet the carbon equivalent (CE) single pass strength classification, the weld deposit may not have sufficient ductility to comply with the remainder of the AWS classification. For example, when the as-welded deposit is subjected to a longitudinal bend (e.g., about a 0.75 in radius), openings may begin to form in the weld bead. However, for this example, it may be appreciated that, once the weld deposit has been subjected to post-weld heat treatment (e.g., approximately 1200° F. for approximately 1 hour or less), the weld deposit may pass similar longitudinal bend tests while still maintaining a high strength. However, it may be appreciated that, for applications where strength is the only concern, the example weld deposit may be acceptable for use without the post-weld heat treatment.

Additionally, Table 3 below includes chemical analysis of weld deposits formed using a commercially available tubular welding wire, FabCOR® F6 (available from Hobart Brothers Company of Troy, Ohio) and using embodiments E1-E3 of the present tubular welding wire 50 for three different welding experiments (i.e., a melt-button, an AWM Chem Pad, and 1 layer pad). As set forth above, the tubular welding wire 50 (e.g., embodiments E1, E2, E3, and E5) may deposit one or more of the corrosion resistant components discussed above to limit, block, or prevent corrosion within the resulting weld deposit. For example, in certain embodiments, the weld deposit may include one or more of nickel, chromium, copper, and mixtures or alloys thereof, which may limit corrosion of the weld deposit by reactive species, such as oxygen. It may be appreciated that certain embodiments of the disclosed tubular welding wire 50 may produce low alloy weld deposits having a martensitic and/or a ferritic structure, while other embodiments may produce high alloy weld deposit having a martensitic and/or a ferritic structure. As used herein, a "low alloy weld deposit" is a weld deposit having an iron content greater than 50% by weight and a total alloy content (e.g., chromium, nickel, copper, etc.) less than 10% by weight. As used herein, a "high alloy weld deposit" is a weld deposit having an iron content greater than 50% by weight and a total alloy content (e.g., chromium, nickel, copper, etc.) greater than 10% by weight. For example, in certain embodiments, the weld deposit may be a stainless steel. By specific example, in certain embodiments, the weld deposit may be a 200 series stainless steel, a 300 series stainless steel, or a 400 series stainless steel.

By specific example, as set forth in Table 3, in certain embodiments, copper may account for between approximately 0.05% and approximately 2%, between approximately 0.07% and approximately 1%, between approximately 0.08% and approximately 0.9%, between approximately 0.09% and approximately 0.8%, between approximately 0.1% and approximately 0.8%, or approximately 0.4% of the weld deposit by weight. By further example, in certain embodiments, chromium may account for between approximately 0.4% and approximately 20%, between approximately 0.5% and approximately 16%, between approximately 0.6% and approximately 11%, between approximately 0.7% and approximately 10% of the weld deposit by weight. By still further example, in certain embodiments, nickel may account for between approximately 0.1% and approximately 1%, between approximately 0.2% and approximately 0.7%, between approximately 0.3% and approximately 0.65%, between approximately 0.4% and approximately 0.65%, or approximately 0.35% of the weld deposit by weight. Additionally, in certain embodiments, molybdenum may be present in the tubular welding wire 50, a portion of which may be incorporated into the resulting weld deposit. By specific example, in certain embodiments, molybdenum may account for between approximately 0.001% and approximately 0.2%, between approximately 0.01% and approximately 0.15%, between approximately 0.01% and approximately 1.2%, or approximately 0.07% of the weld deposit by weight. In other embodiments, titanium and/or niobium may, additionally or alternatively, be present in the weld deposit.

Technical effects of the present disclosure include enabling the formation of corrosion resistant weld deposits on coated workpieces. In particular, the presently disclosed tubular welding wires include one or more corrosion resistant components (e.g., nickel, chromium, copper, and/or alloys or mixtures thereof) that may enable a weld deposit to have enhanced or improved resistance to corrosion or oxidation. Furthermore, in certain embodiments, the disclosed tubular welding wire may have a suitable composition to enable the formation of weld deposits having relatively high chromium content (e.g., 4-6 wt % chromium), which may hold nitrogen in solution within the weld deposit to mitigate or prevent weld porosity when welding nitrided steel workpieces. Accordingly, the presently disclosed tubular welding wires enhance the weldability of coated (e.g., galvanized, galvannealed, aluminized, nitrided, painted, and so forth) workpieces and/or thinner (e.g., 20-, 22-, 24-gauge, or thinner) workpieces, even at high travel speed (e.g., greater than 30 in/min or greater than 40 in/min).

TABLE 3

Chemical analysis of weld deposits formed using the commercially available FabCOR ® F6 welding wire as well as embodiments E1, E2, E3 and E5 of the disclosed tubular welding wire 50. Values are provided in weight percentage relative to the total weight of the weld deposit. Note that E5 is illustrated under both DCEP and DCEN bias, and that the composition of the base plate is also included in the table for the 1 layer pad welding experiments. Further note that italicized values are higher due to unintentional pick-up of tungsten and/or copper from the electrode and/or crucible during the welding operation.

| Welding Wire | Melt-Button | | | | AWM Chem Pad | | | |
|---|---|---|---|---|---|---|---|---|
| | F6 | E1 | E2 | E3 | F6 | E1 | E2 | E3 |
| Carbon | 0.126 | 0.059 | 0.136 | 0.085 | 0.105 | 0.115 | 0.118 | 0.102 |
| Manganese | 1.655 | 1.548 | 1.832 | 1.869 | 1.456 | 1.701 | 1.671 | 1.855 |
| Phosphorous | 0.006 | 0.010 | 0.011 | 0.013 | 0.007 | 0.011 | 0.012 | 0.016 |
| Sulfur | 0.010 | 0.013 | 0.016 | 0.018 | 0.014 | 0.013 | 0.015 | 0.021 |
| Silicon | 0.856 | 0.892 | 1.044 | 1.254 | 0.852 | 1.085 | 1.111 | 1.403 |
| Copper | 0.068 | 0.921 | 0.581 | 0.075 | 0.056 | 0.611 | 0.615 | 0.052 |
| Chromium | 0.036 | 0.663 | 2.617 | 15.86 | 0.026 | 0.705 | 2.638 | 15.64 |
| Vanadium | 0.003 | 0.005 | 0.003 | 0.014 | 0.004 | 0.005 | 0.003 | 0.017 |
| Nickel | 0.003 | 0.583 | 0.668 | 0.032 | 0.023 | 0.622 | 0.646 | 0.021 |
| Molybdenum | 0.006 | 0.101 | 0.099 | 0.011 | 0.006 | 0.121 | 0.119 | 0.012 |
| Aluminum | 0.018 | 0.001 | 0.027 | 0.006 | 0.001 | 0.008 | 0.009 | 0.018 |
| Titanium | 0.019 | 0.007 | 0.018 | 0.027 | 0.018 | 0.022 | 0.023 | 0.029 |
| Niobium | 0.002 | 0.003 | 0.003 | 0.007 | 0.003 | 0.005 | 0.006 | 0.011 |
| Cobalt | 0.001 | 0.002 | 0.003 | 0.027 | 0.002 | 0.006 | 0.007 | 0.041 |
| Boron | 0.00125 | 0.00335 | 0.00148 | 0.00163 | 0.00044 | 0.00092 | 0.00106 | 0.00144 |
| Tungsten | 0.116 | 2.037 | 0.11 | 0.012 | 0.005 | 0.015 | 0.015 | 0.017 |
| Tin | 0.0072 | 0.011 | 0.012 | 0.0017 | 0.004 | 0.012 | 0.013 | 0.017 |
| Lead | <0.0001 | <0.0001 | <0.0001 | <0.0001 | <0.0001 | <0.0001 | <0.0001 | 0.0016 |
| Zirconium | 0.0016 | 0.0022 | 0.0022 | 0.0029 | <0.001 | <0.001 | 0.0016 | 0.0034 |
| Antimony | 0.0016 | 0.0108 | 0.0028 | 0.0075 | 0.0018 | 0.0006 | 0.0025 | 0.0070 |

TABLE 3-continued

Chemical analysis of weld deposits formed using the commercially available FabCOR ® F6 welding wire as well as embodiments E1, E2, E3 and E5 of the disclosed tubular welding wire 50. Values are provided in weight percentage relative to the total weight of the weld deposit. Note that E5 is illustrated under both DCEP and DCEN bias, and that the composition of the base plate is also included in the table for the 1 layer pad welding experiments. Further note that italicized values are higher due to unintentional pick-up of tungsten and/or copper from the electrode and/or crucible during the welding operation.

| Arsenic | 0.00398 | 0.00487 | 0.00357 | 0.01713 | 0.00347 | 0.00271 | 0.00181 | 0.01389 |

| | 1 layer pad (90/10 gas) | | | | | | |
|---|---|---|---|---|---|---|---|
| Welding Wire | F6 | E1 | E2 | E3 | E5 (DCEP) | E5 (DCEN) | Base Plate |
| Carbon | 0.143 | 0.131 | 0.135 | 0.130 | 0.123 | 0.134 | 0.107 |
| Manganese | 1.283 | 1.58 | 1.543 | 1.511 | 1.65 | 1.62 | 0.98 |
| Phosphorous | 0.010 | 0.011 | 0.012 | 0.016 | 0.009 | 0.009 | 0.009 |
| Sulfur | 0.008 | 0.010 | 0.010 | 0.015 | 0.019 | 0.018 | 0.025 |
| Silicon | 0.627 | 0.859 | 0.831 | 0.912 | 0.91 | 0.92 | 0.22 |
| Copper | 0.140 | 0.487 | 0.505 | 0.153 | 0.46 | 0.47 | 0.23 |
| Chromium | 0.072 | 0.515 | 1.785 | 10.34 | 3.80 | 3.74 | 0.08 |
| Vanadium | 0.004 | 0.005 | 0.004 | 0.009 | 0.008 | 0.008 | 0.02 |
| Nickel | 0.078 | 0.456 | 0.490 | 0.071 | 0.43 | 0.43 | 0.09 |
| Molybdenum | 0.017 | 0.081 | 0.082 | 0.023 | 0.08 | 0.07 | 0.02 |
| Aluminum | 0.014 | 0.016 | 0.015 | 0.032 | 0.018 | 0.019 | 0.001 |
| Titanium | 0.026 | 0.025 | 0.026 | 0.031 | 0.016 | 0.011 | 0.001 |
| Niobium | 0.001 | 0.004 | 0.004 | 0.008 | 0.005 | 0.005 | 0.001 |
| Cobalt | 0.006 | 0.005 | 0.007 | 0.026 | 0.007 | 0.008 | 0.006 |
| Boron | 0.00029 | 0.00137 | 0.00061 | 0.00149 | 0.00078 | 0.00091 | 0.0001 |
| Tungsten | <0.005 | 0.009 | 0.013 | 0.014 | 0.008 | 0.01 | 0.005 |
| Tin | 0.008 | 0.011 | 0.012 | 0.016 | 0.006 | 0.006 | 0.009 |
| Lead | <0.0001 | <0.0001 | <0.0001 | 0.0008 | <0.0001 | <0.0001 | 0.004 |
| Zirconium | <0.001 | 0.0015 | <0.001 | 0.0045 | <0.001 | <0.001 | <0.001 |
| Antimony | <0.0001 | 0.0006 | <0.0001 | 0.0045 | 0.003 | 0.005 | 0.005 |
| Arsenic | 0.00515 | 0.00358 | 0.00284 | 0.01027 | 0.00347 | 0.00505 | 0.00754 |

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A tubular welding wire comprising a sheath and a core, wherein the tubular welding wire comprises:
   an organic stabilizer component;
   a rare earth component; and
   a corrosion resistant component comprising one or more of: nickel, chromium, and copper;
   wherein the core of the tubular welding wire includes a frit comprising an oxide of a Group I or Group II metal, an oxide of titanium, and an oxide of manganese, and wherein the core comprises between approximately 0.1% and approximately 2% of the frit by weight.

2. The tubular welding wire of claim 1, wherein the one or more corrosion resistant components comprise chromium, and wherein the tubular welding wire comprises between approximately 0.05% and approximately 30% chromium by weight.

3. The tubular welding wire of claim 2, wherein the core comprises between approximately 4% and approximately 80% chromium by weight.

4. The tubular welding wire of claim 2, wherein the sheath comprises less than approximately 20% chromium by weight.

5. The tubular welding wire of claim 1, wherein the one or more corrosion resistant components comprise nickel, and wherein the tubular welding wire comprises between approximately 0.1% and 10% nickel by weight.

6. The tubular welding wire of claim 5, wherein the sheath comprises less than approximately 10% nickel by weight.

7. The tubular welding wire of claim 5, wherein the core comprises less than approximately 4% nickel by weight.

8. The tubular welding wire of claim 1, wherein the one or more corrosion resistant components comprise copper, and wherein the tubular welding wire comprises between approximately 0.1% and 1% copper by weight.

9. The tubular welding wire of claim 8, wherein the core comprises less than approximately 4% copper by weight.

10. The tubular welding wire of claim 1, wherein the core comprises between approximately 0.05% and approximately 5% of the organic stabilizer component by weight.

11. The tubular welding wire of claim 1, wherein the rare earth component comprises one or more elements or compounds of the lanthanide series, and wherein the core comprises between approximately 0.1% and approximately 3% of the rare earth component by weight.

12. The tubular welding wire of claim 1, wherein the sheath comprises 304 stainless steel, 409 stainless steel, 410 stainless steel, or 430 stainless steel, or a combination thereof.

13. The tubular welding wire of claim 1, wherein the organic stabilizer component comprises a Group I or Group II salt of carboxymethyl cellulose.

* * * * *